(12) United States Patent
Shimizu et al.

(10) Patent No.: US 12,336,464 B2
(45) Date of Patent: Jun. 24, 2025

(54) DRIVING APPARATUS

(71) Applicant: YAMABIKO CORPORATION, Tokyo (JP)

(72) Inventors: Kunio Shimizu, Ohme (JP); Hisato Osawa, Ohme (JP)

(73) Assignee: YAMABIKO CORPORATION (JP)

( * ) Notice: Subject to any disclaimer, the term of this patent is extended or adjusted under 35 U.S.C. 154(b) by 631 days.

(21) Appl. No.: 17/567,214

(22) Filed: Jan. 3, 2022

(65) Prior Publication Data

US 2022/0256774 A1    Aug. 18, 2022

(30) Foreign Application Priority Data

Feb. 16, 2021 (JP) .................... 2021-022461

(51) Int. Cl.
*A01G 3/053* (2006.01)
*B23Q 11/00* (2006.01)
(Continued)

(52) U.S. Cl.
CPC .......... *A01G 3/053* (2013.01); *B23Q 11/0089* (2013.01); *B25F 5/02* (2013.01); *B27B 17/0008* (2013.01)

(58) Field of Classification Search
CPC .. A01G 3/0475; A01G 3/053; B23Q 11/0089; A01D 34/90; B25F 5/02; B27B 17/00; B27B 17/0008; F16P 3/00
See application file for complete search history.

(56) References Cited

U.S. PATENT DOCUMENTS 6,842,987 B1 * 1/2005 Martinsson ........... B27B 17/083
30/381
6,878,888 B1 * 4/2005 Jong ..................... B27B 17/083
30/381
(Continued)

FOREIGN PATENT DOCUMENTS

CN      106457547 B   5/2020
JP    2002-213258 A   7/2002
(Continued)

OTHER PUBLICATIONS

European Search Report issued for the corresponding European Patent Application No. 21218049.1; dated May 31, 2022 (total 7 pages).
(Continued)

*Primary Examiner* — Jason Daniel Prone
(74) *Attorney, Agent, or Firm* — Harness, Dickey & Pierce, P.L.C.

(57) ABSTRACT

A handheld driving apparatus includes a container having a grasping member, a lock member having a protrusion, a trigger lever, and an action unit. The lock member moves between first and second positions along right and left directions. The second position is a fully pressed position. The trigger lever moves between third and fourth positions. The fourth position is a fully pressed position. The trigger lever is restricted from moving toward the fourth position by contacting the first protrusion when the lock member is in the first position. The trigger lever is free to move toward the fourth position without contacting the first protrusion when the lock member is in the second position. The action unit performs a mechanical action for mowing or cutting an object when the trigger lever is in the fourth position.

5 Claims, 12 Drawing Sheets

(51) Int. Cl.
*B25F 5/02* (2006.01)
*B27B 17/00* (2006.01)

(56) References Cited

U.S. PATENT DOCUMENTS

| | | | | |
|---|---|---|---|---|
| 7,866,048 | B2* | 1/2011 | Kodama | B25F 5/02 |
| | | | | 30/381 |
| 9,636,792 | B2 | 5/2017 | Mandalka et al. | |
| 10,605,406 | B2* | 3/2020 | Martinsson | B27B 17/00 |
| 11,015,760 | B2* | 5/2021 | Martinsson | F16P 3/00 |
| 11,938,608 | B2* | 3/2024 | Hatakeyama | B25F 5/02 |
| 12,083,612 | B2* | 9/2024 | Osawa | B25F 5/02 |
| 2003/0088987 | A1* | 5/2003 | Jong | B27B 17/10 |
| | | | | 30/381 |
| 2003/0089575 | A1* | 5/2003 | Jong | B27B 17/08 |
| | | | | 192/129 A |
| 2012/0048584 | A1* | 3/2012 | Sato | B25F 5/02 |
| | | | | 173/170 |
| 2014/0174772 | A1 | 6/2014 | Mandalka et al. | |
| 2014/0190713 | A1* | 7/2014 | Martinsson | A01G 3/053 |
| | | | | 30/381 |
| 2014/0352160 | A1 | 12/2014 | Ifuku et al. | |
| 2015/0283631 | A1* | 10/2015 | Seki | B27B 17/083 |
| | | | | 30/381 |

FOREIGN PATENT DOCUMENTS

| | | |
|---|---|---|
| JP | 2009-255236 A | 11/2009 |
| JP | 5698035 B2 | 4/2015 |
| JP | 2019-025636 A | 2/2019 |
| WO | 2018-230707 A1 | 12/2018 |

OTHER PUBLICATIONS

Office Action issued in the corresponding Japanese Patent Application No. 2021-022461; mailed on Aug. 27, 2024 (total 10 pages).

* cited by examiner

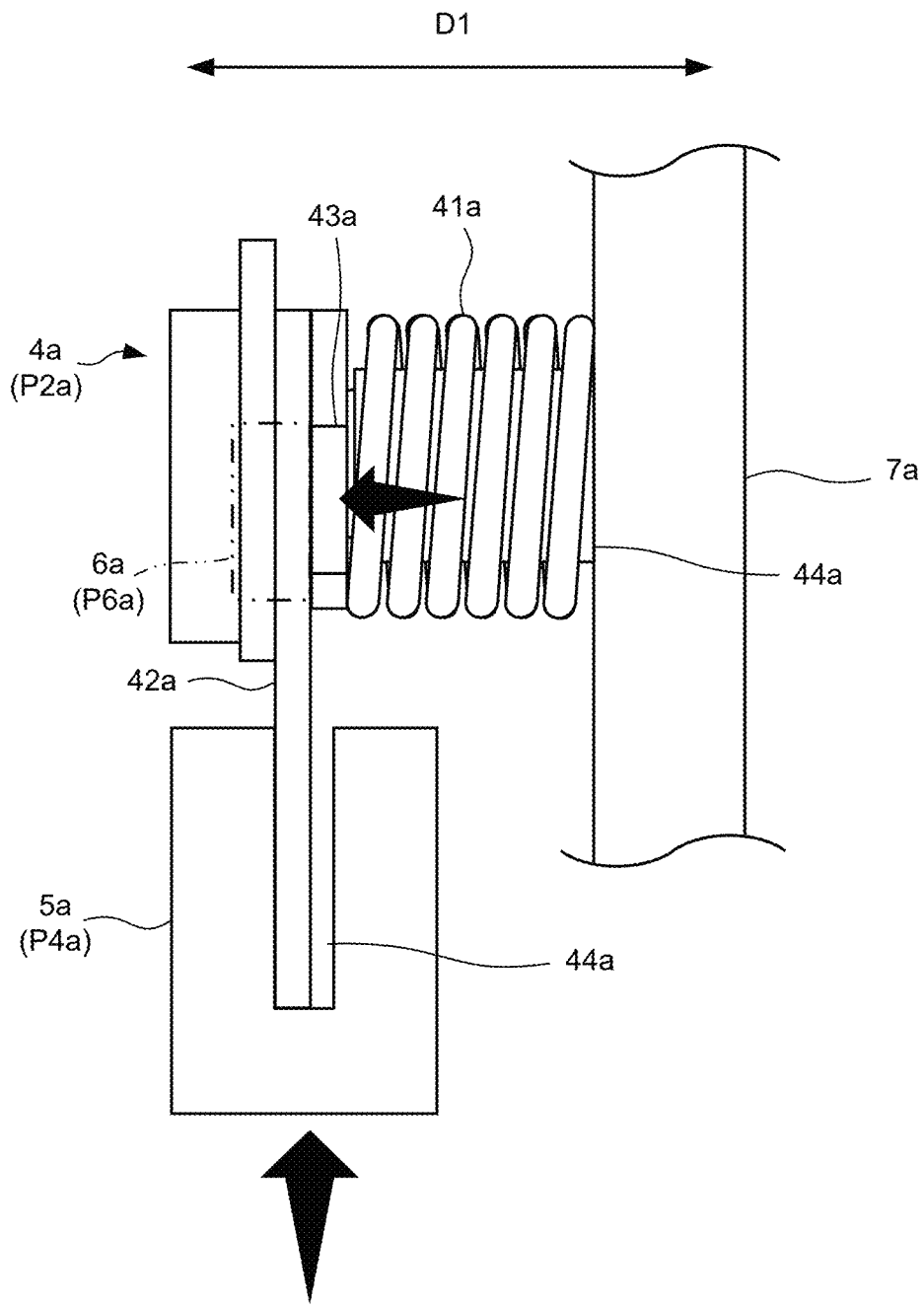

DRIVING APPARATUS

CROSS REFERENCE TO RELATED APPLICATIONS

The present application claims priority under 35 U.S.C. § 119 to Japanese Patent Application No. 2021-022461, filed Feb. 16, 2021. The contents of this application are incorporated herein by reference in their entirety.

BACKGROUND

Technical Field

The present invention relates to a driving apparatus.

Background Art

Handheld driving apparatus utilized for mowing or cutting grass, trees, or other objects has a stricter safety standard, and is configured to be turned on by independently executing operation of a lockout lever (lock member) and a trigger lever.

U.S. Pat. No. 9,636,792 discloses a technology in which a lockout lever (holding member) and a button (lock member) are operated simultaneously to enter a lockout state, and power is turned on by operating a trigger lever.

SUMMARY OF THE INVENTION

However, the technology disclosed in U.S. Pat. No. 9,636,792 requires the lockout lever (lock member) and the button (holding member) to be operated simultaneously so as to turn on the power of a driving apparatus, which is complicated to operate.

According to one aspect of the present invention, there is provided a handheld driving apparatus for mowing or cutting an object. The driving apparatus comprises: a container, a lock member, a trigger lever, and an action unit. The container is configured to extend from a rear side where a user is located toward a front side where the object is located. The lock member is configured to move between a first position and a second position, a straight line connecting the first position and the second position extending in a direction in which the container extends or in a direction orthogonal to a direction in which the container extends. The trigger lever is configured to move between a third position and a fourth position, to be restricted from moving to the fourth position when the lock member is at the first position, and not to be restricted from moving to the fourth position when the lock member is at the second position. The action unit is provided on the front side of the container, and is configured to drive in such a manner that a mechanical action for mowing or cutting the object can be applied to the object when the trigger lever is at the fourth position.

According to such an output operation of the driving apparatus, power can be turned on by operating the trigger lever after operating the lock member. Therefore, operability of the driving apparatus can be further improved.

BRIEF DESCRIPTION OF THE DRAWINGS

FIG. 12 is a schematic view showing a lockout (released or fully-pressed) state and the mechanism of the lock member 4a, the trigger lever 5a, and the holding member 6a according to the second embodiment.

DETAILED DESCRIPTION OF EMBODIMENTS

Hereinafter, embodiments of the present invention will be described with reference to the drawings. Various features described in the embodiment below can be combined with each other.

1. Overall Configuration

In chapter 1, a driving apparatus according to the present embodiment will be described. A driving apparatus 1 is a handheld apparatus for mowing or cutting an object. Preferably, the driving apparatus 1 is a brush cutter 11 or a chain saw (not shown). Hereinafter, the brush cutter 11 (the driving apparatus 1) will be described as an example.

Figure 1:
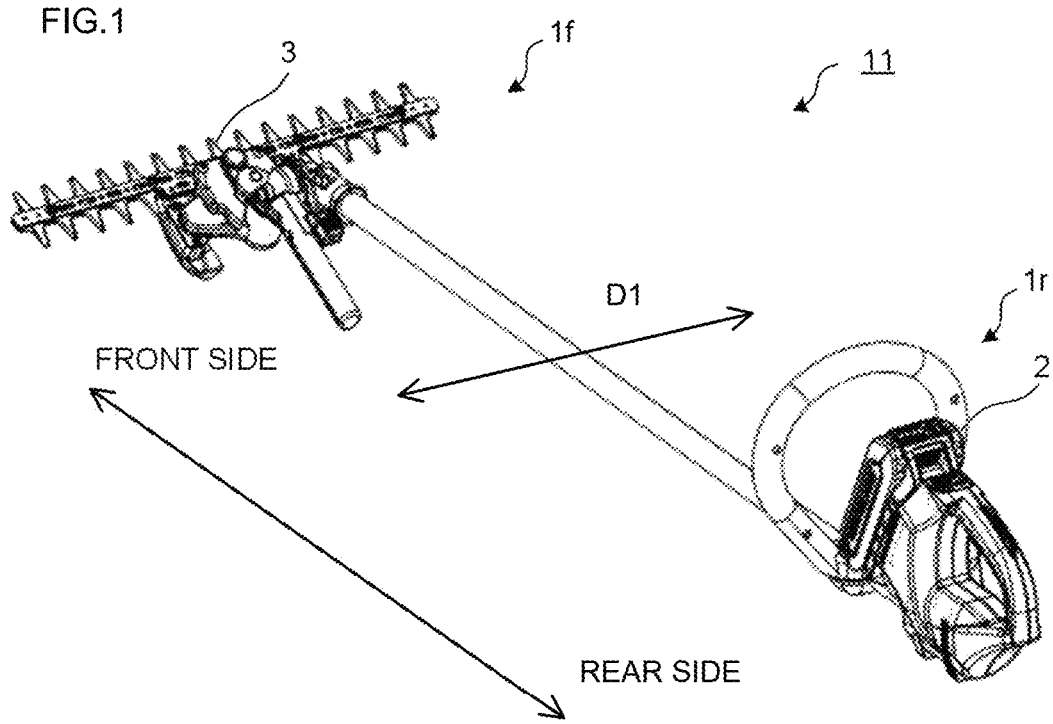
FIG. 1 is a schematic view showing a brush cutter 11.
Figure 2:
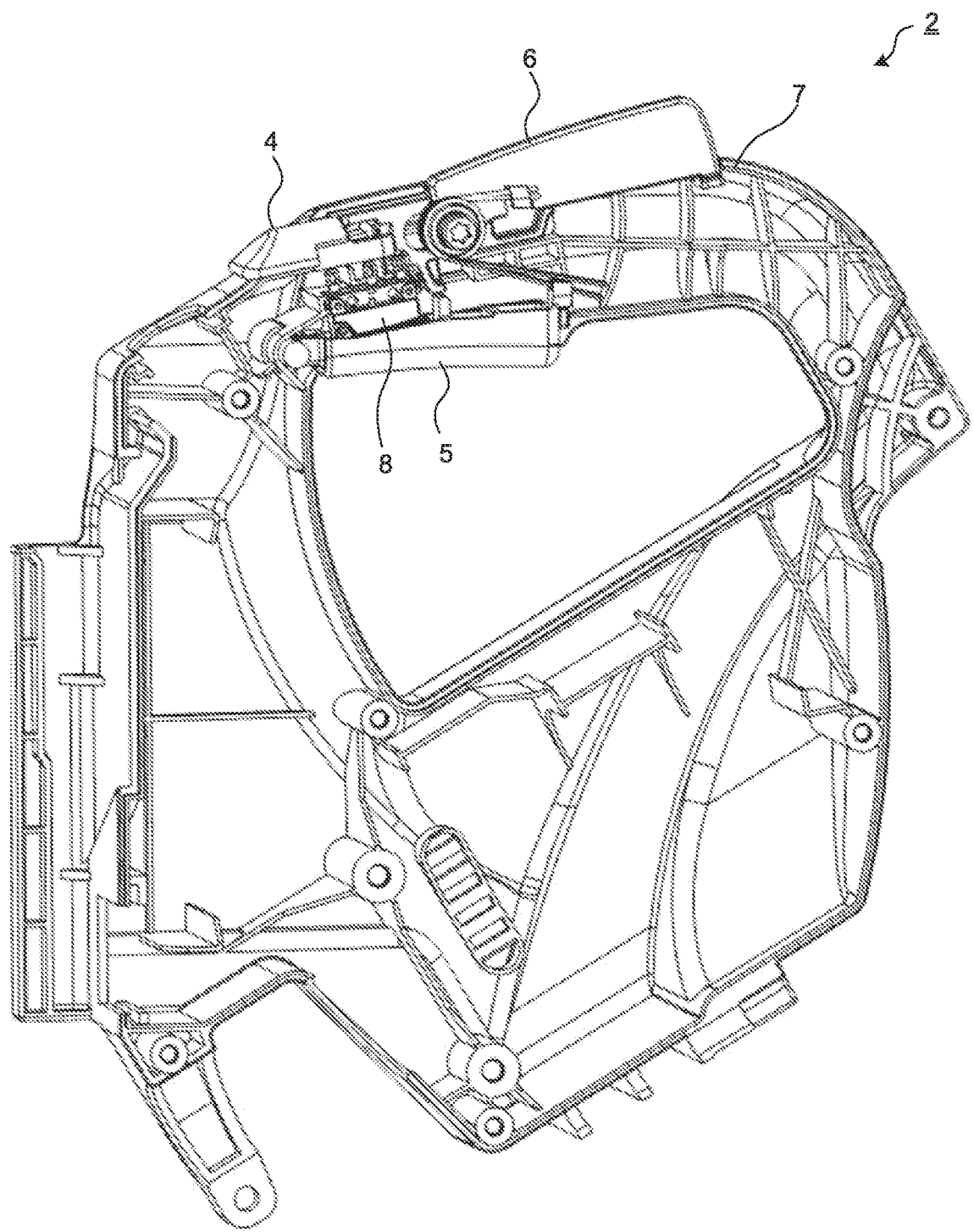
FIG. 2 is a cross-sectional view showing a configuration of a container 2 of the brush cutter 11.

FIG. 1 is a schematic view showing the brush cutter 11. As shown in FIG. 1, the brush cutter 11 comprises a container 2 and an action unit 3. FIG. 2 is a cross-sectional view showing a configuration of the container 2 of the brush cutter 11. As shown in FIG. 2, the brush cutter 11 comprises a lock member 4, a trigger lever 5, a holding member 6, a grasping member 7, and a limit switch 8. The grasping member 7 may be a part of the container 2, or may be provided independently. Furthermore, the lock member 4, the trigger lever 5 or the holding member 6 may be connected to the grasping member 7.

1.1 Container 2

In the present embodiment, the container 2 is a box containing mechanical and electrical device that allows the brush cutter 11 to operate, and includes an operating rod of the brush cutter 11. Thus, the container 2 extends from a rear side where a user is located toward a front side where an object is located. Although length of the container 2 is not particularly limited, it is preferable that the length is an appropriate length corresponding to height of an adult since the assumed user is an adult. In this way, by adopting the elongated pipe-shaped operation rod as the container, the user can efficiently perform cutting or mowing of weeds or the like generated on the ground while walking in a natural posture without having to bend down. Further, a device such as a motor or a shaft (not shown) is provided inside the container 2 and connected to a blade comprised by the action unit 3 described later in such a manner that power can be transmitted. As shown in FIG. 1, a direction indicating the right and left sides of a user as seen by the user who cuts grass by holding the brush cutter 11 is defined as a right and left direction D1.

1.2 Action Unit 3

In the brush cutter 11, the action unit 3 is provided at a front side of the container 2. Thus, as shown in FIG. 1, the handheld driving apparatus 1 extends along a longitudinal direction from the action unit 3 at the front side to the container 2 at the rear side in a plan view. Note that the right and left direction D1 shown in FIG. 1 is perpendicular to the longitudinal direction in the plan view. The action unit 3 is configured to drive in such a manner that a mechanical action for mowing or cutting the object can be applied to the object. Thus, the action unit 3 comprises a blade for mowing or cutting the object. Moreover, the blade may be configured to be rotatably driven or linearly driven.

1.3 Lock Member 4

Figure 3:
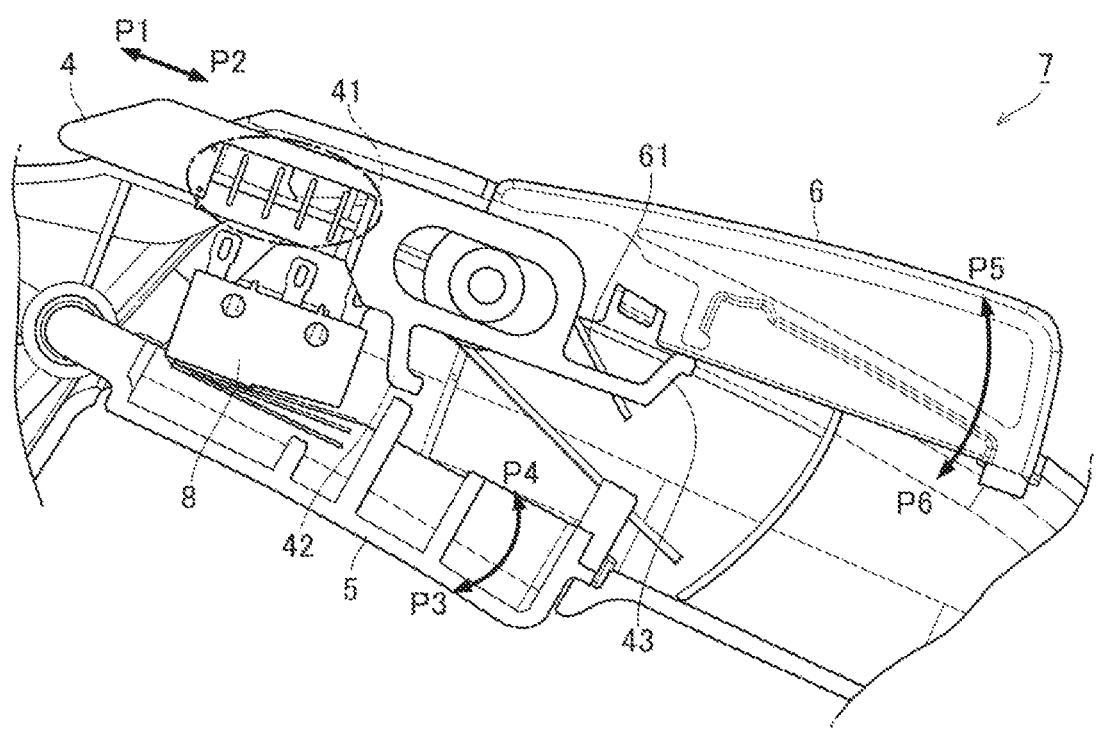
FIG. 3 is a cross-sectional view showing a grasping member 7 in a lock (state of restriction) state of a lock member 4.
Figure 4:
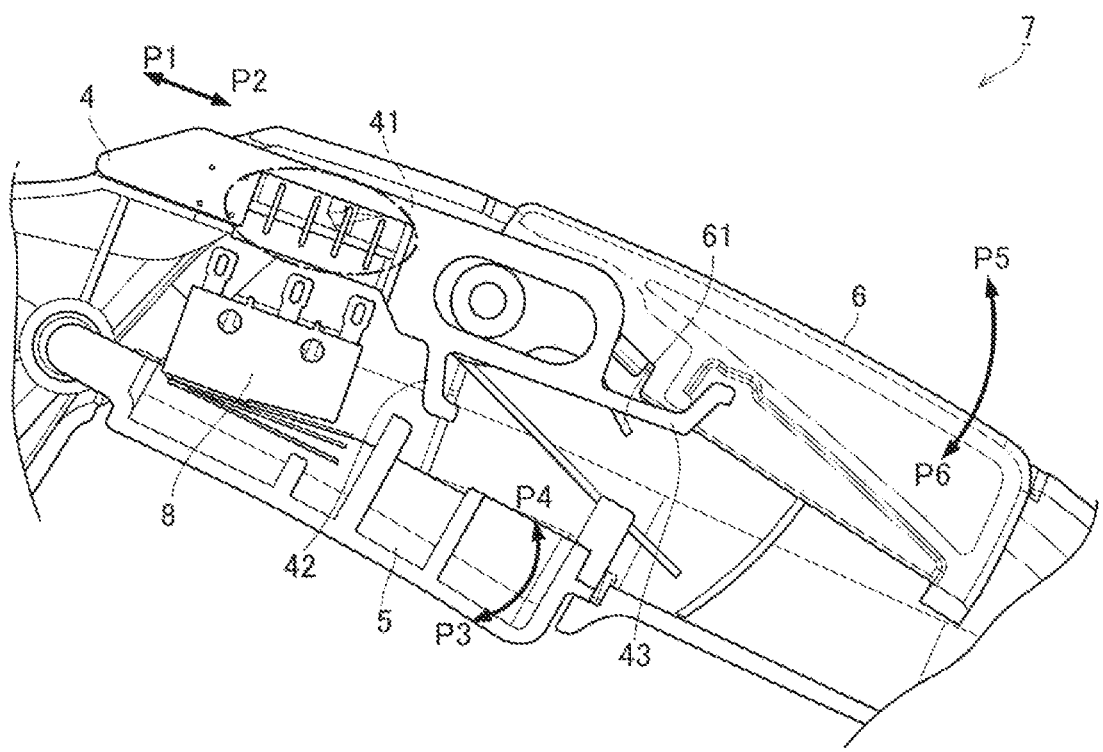
FIG. 4 is a cross-sectional view showing a lockout (state of release) state of the lock member 4.

FIG. 3 is a cross-sectional view showing the grasping member 7 in a lock (state of restriction) state of the lock member 4. FIG. 4 is a cross-sectional view showing a lockout (state of release) state of the lock member 4. As shown in FIGS. 3 and 4, the lock member 4 is connected to the container 2 and is configured to move between a first position P1 and a second position P2. A straight line connecting the first position P1 and the second position P2 extends in a direction in which the container 2 extends. Material and configuration such as size or shape of the lock member 4 are not limited as long as the user can operate the lock member 4. In addition, the lock member 4 comprises a first elastic member 41, a first protrusion 42, and a second protrusion 43. Here, the elastic member is an object having elasticity.

Figure 5:
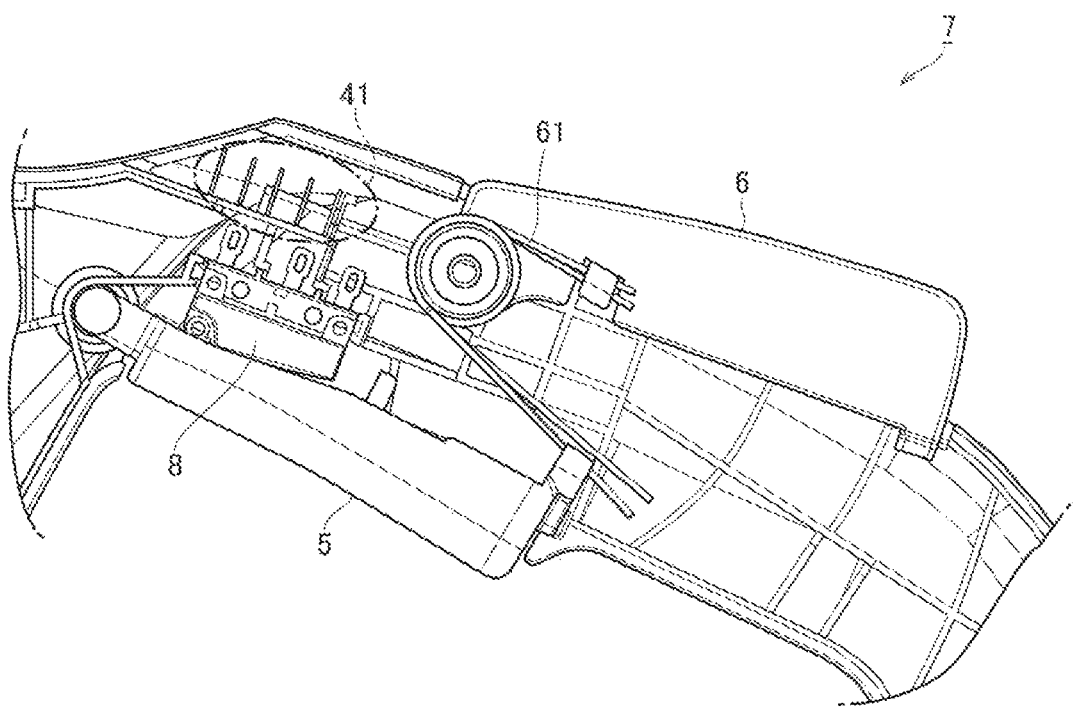
FIG. 5 is a cross-sectional view showing an elastic member comprised by the lock member 4 and a holding member 6.

FIG. 5 is a cross-sectional view showing an elastic member comprised by the lock member 4 and the holding member 6. As shown in FIG. 5, the lock member 4 comprises the first elastic member 41 between the lock member 4 and the container 2. Since an end of the first elastic member 41 is in contact with the container 2, the first elastic member 41 energizes the lock member 4 in a direction from the second position P2 to the first position P1. Therefore, the lock member 4 remains in a position of the first position P1 unless it is pressed. The first elastic member 41 may be any other spring such as a compression coil spring or a plate spring, or may be any other elastic material such as a rubber or an elastomer. Physical properties of the first elastic member 41, such as spring constant and Young's modulus, are not limited.

The first protrusion 42 is in contact with the trigger lever 5 in a state where the lock member 4 is at the first position P1, and the second protrusion 43 is in contact with the holding member 6 in the state where the lock member 4 is at the first position P1. In this way, the first protrusion 42 and the second protrusion 43 are respectively in contact with the trigger lever 5 and the holding member 6 in the state where the lock member 4 is at the first position P1, thereby restricting movement of the trigger lever 5 and the holding member 6. Thus, the brush cutter 11 is in the lock (state of restriction) state as long as the user does not press the lock member 4 to move from the first position P1 to the second position P2. As a result, even if the user or an object unintentionally touches the lock member 4, the lock (state of restriction) state will not be released and the brush cutter 11 will not be driven unintentionally.

1.4 Trigger Lever 5

The trigger lever 5 is connected to the container 2 and is configured to move between a third position P3 and a fourth position P4. However, the trigger lever 5 is restricted from moving to the fourth position P4 when the lock member 4 is at the first position P1, and is not restricted from moving to the fourth position P4 when the lock member 4 is at the second position P2. Therefore, movement range of the trigger lever 5 is restricted by the position of the lock member 4. With such a configuration, the aforementioned action unit 3 is configured to not drive when the trigger lever 5 is at the third position P3, and the action unit 3 is configured to drive when the trigger lever 5 is at the fourth position P4. Material and configuration such as size or shape of the trigger lever 5 are not limited as long as the user can operate the trigger lever 5. However, for the shape, a shark fin type lever is preferable in consideration of operability.

1.5 Holding Member 6

The holding member 6 is connected to the container 2 and is configured to move between a fifth position P5 and a sixth position P6. The holding member 6 is restricted from moving to the sixth position P6 of the holding member 6 when the lock member 4 is at the first position P1. On the other hand, the holding member 6 is not restricted from moving to the sixth position P6 of the holding member 6 when the lock member 4 is at the second position P2. Therefore, after the lock member 4 is pressed and moved from the first position P1 to the second position P2, the holding member 6 is configured to restrict the movement of the lock member 4 when the holding member 6 is at the sixth position P6. In other words, the lockout (state of release) state is maintained. Material and configuration such as size or shape of the holding member 6 are not limited as long as the user can operate the holding member 6. However, for the shape, a shark fin type lever is preferable in consideration of operability.

As shown in FIG. 5, the holding member 6 comprises a second elastic member 61 between the holding member 6 and the container 2, the second elastic member 61 energizing the holding member 6 in a direction from the sixth position P6 to the fifth position P5. In this way, the holding member 6 moves to the sixth position P6 by being pressed. After the movement, by contacting with the second protrusion 43 in a state in which the holding member 6 is at the sixth position P6, the holding member 6 is configured to restrict the lock member 4 from moving from the second position P2 to the first position P1. Thus, the lockout (state of release) state is maintained by the user continuously pressing the holding member 6. As a result, the trigger lever 5 is not restricted from moving between the third position P3 and the fourth position P4, and the user can drive or stop the brush cutter 11. The second elastic member 61 may be a torsion bar (torsion spring) as shown in FIG. 5, or may be other springs such as a compression coil spring, a plate spring, or other elastic material such as a rubber or an elastomer. Physical properties of the second elastic member 61, such as spring constant and Young's modulus, are not limited.

1.6 Grasping Member 7

The grasping member 7 is a portion that the user grasps in operating the brush cutter 11. In the present embodiment, the grasping member 7 is not limited to the portion grasped by a hand of the user, but also includes surrounding area thereof. Therefore, the lock member 4 for operating the brush cutter 11 is connected to the grasping member 7 and may be energized to move from the first position P1 to the second position P2. When the lock member 4 is moved by the hand grasping the brush cutter 11, the operating range becomes smaller, thus the operability is improved.

Similarly, the trigger lever 5 is connected to the grasping member 7, and is pressed down to move from the third position P3 to the fourth position P4. As shown in FIGS. 2 to 5, the trigger lever 5 is connected to an upper portion or a lower portion of the grasping member 7 in such a manner that the user can move the trigger lever 5 while grasping the brush cutter 11. The holding member 6 is connected to the grasping member 7 opposing the trigger lever 5, and may be pressed to move from the fifth position P5 to the sixth position P6. By connecting the holding member 6 to the opposing grasping member 7, the user can allow the grasping member 7 and the holding member 6 to move simultaneously or independently.

1.6 Limit Switch 8

The limit switch 8 is arranged between the lock member 4 and the trigger lever 5. The limit switch 8 is a mechanically actuated switch, which is an electrical switch having function of opening/closing an electrical circuit (not shown) associated with the brush cutter 11. Therefore, in the present embodiment, the limit switch 8 is configured to mechanically actuated and to energize an electric circuit (not shown) to drive the action unit 3 when the lock member 4 moves to the second position P2 and the trigger lever 5 moves to the fourth position P4. Due to its high mechanical strength and excellent environmental resistance, the limit switch 8 is preferably to be utilized in a device used outdoors with vibration during driving such as the brush cutter 11.

2. Second Embodiment

In this chapter, the second embodiment will be illustrated. In the second embodiment, a straight line connecting a first position P1a and a second position P2a of a lock member 4a of a brush cutter 11a extends in a right and left direction orthogonal a front and rear direction in which a container 2 (having the grasping member 7a) extends. Descriptions of part overlapping with the above-described embodiment will be omitted as appropriate.

Figure 6:
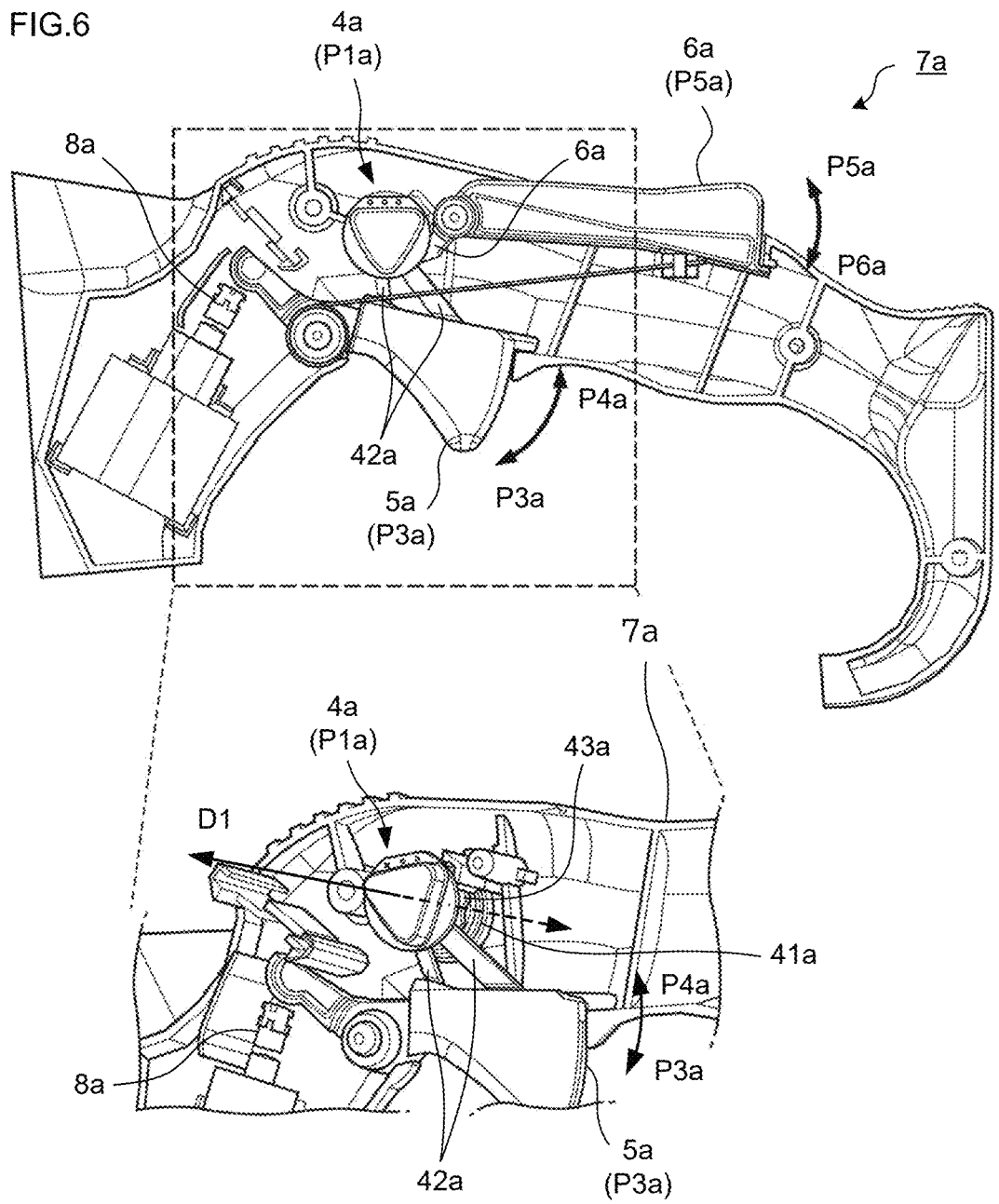
FIG. 6 is a schematic view showing a lock (state of restriction) state and mechanism of a lock member 4a, a trigger lever 5a, and a holding member 6a according to a second embodiment.
Figure 7:
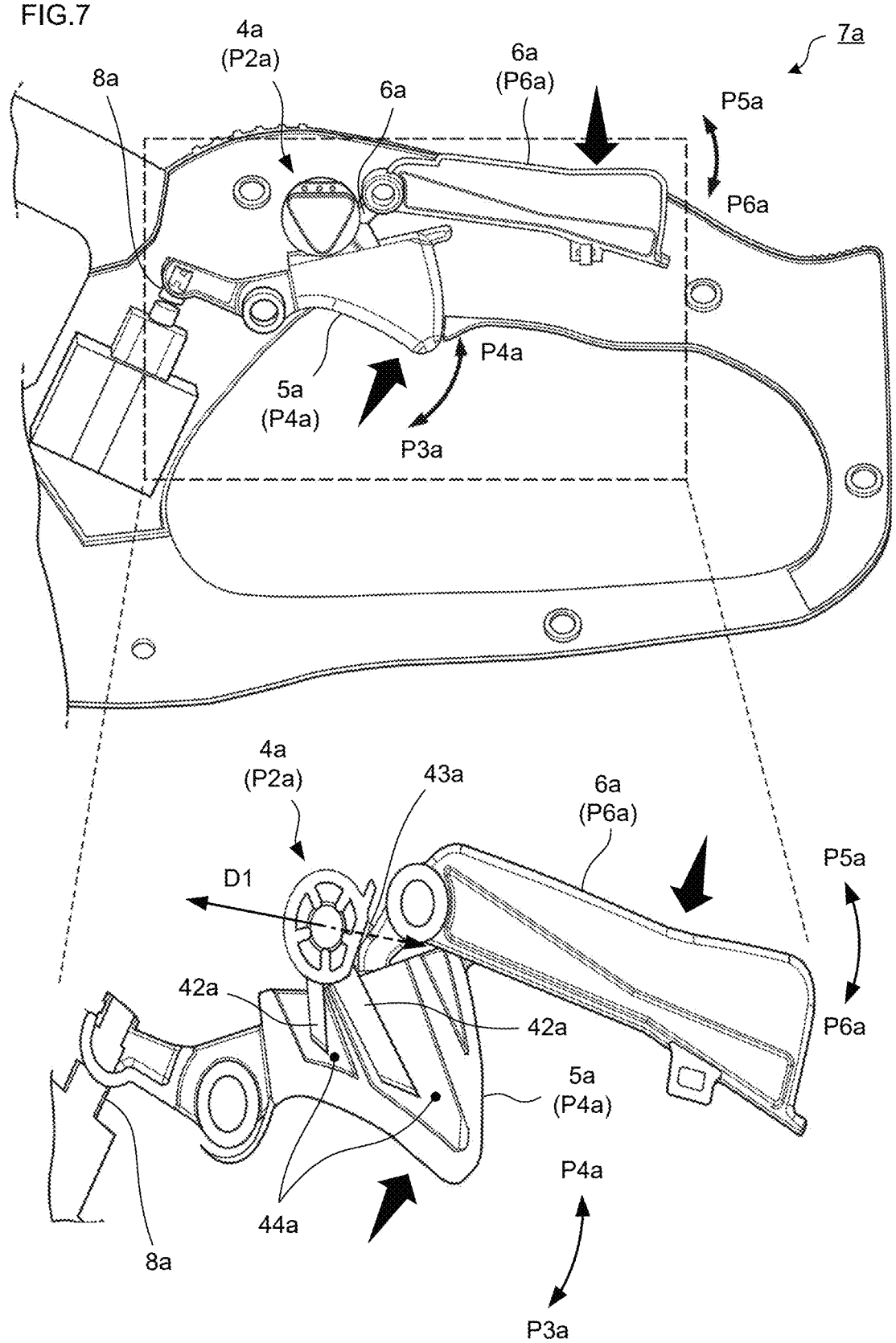
FIG. 7 is a schematic view showing a lockout (state of release) state and mechanism of the lock member 4a, the trigger lever 5a, and the holding member 6a according to the second embodiment.

FIG. 6 is a schematic view showing a lock (state of restriction) state and mechanism of a lock member 4a, a trigger lever 5a, and a holding member 6a according to the second embodiment. FIG. 7 is a schematic view showing a lockout (state of release) state and mechanism of the lock member 4a, the trigger lever 5a, and the holding member 6a according to the second embodiment. As shown in each drawing, components in the second embodiment are the same as those in the above-described embodiment.

Hereinafter, a difference between the second embodiment and the above-described embodiment will be illustrated. The lock member 4a comprises a cylindrical convex portion 45a (see FIG. 10) and is engaged with a cylindrical concave portion 46a (see FIG. 10) comprised inside the container 2. Such an engagement allows the cylindrical convex portion to move in an axial direction (a right and left direction D1 (see FIG. 1)). Therefore, the lock member 4a can move linearly between a first position P1a and a second position P2a. Here, a straight line connecting the first position P1a and the second position P2a extends along the right and left direction D1 orthogonal to the front and rear direction in which the container 2 (having the grasping member 7a) extends.

Figure 8:
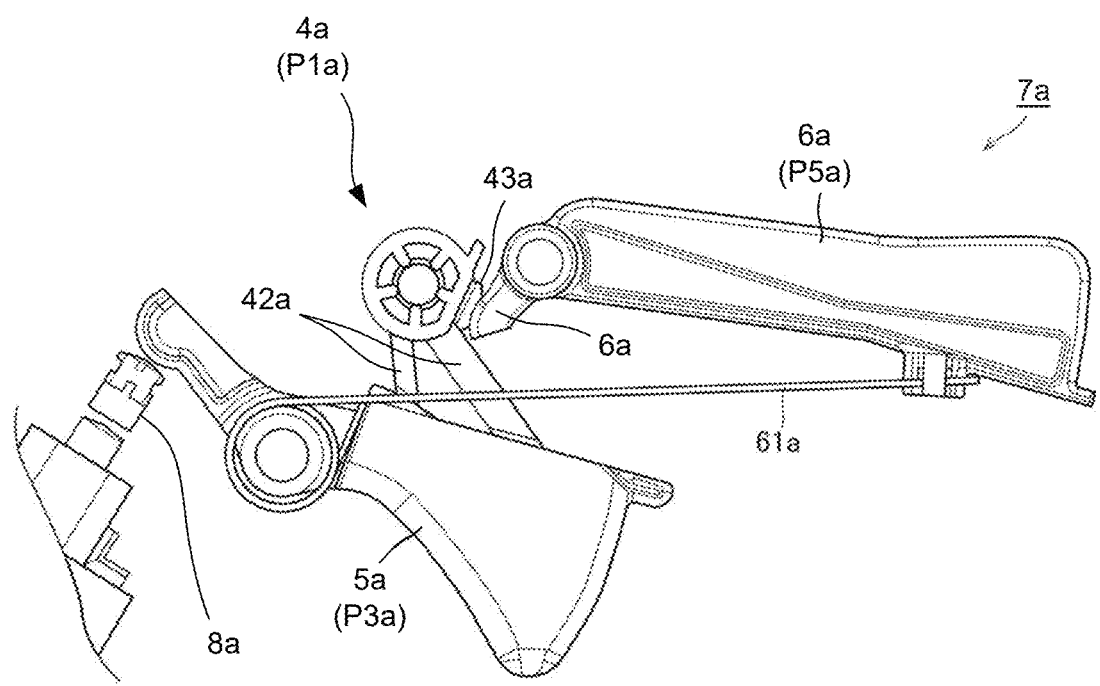
FIG. 8 is a cross-sectional view showing an elastic member comprised by the trigger lever 5a and the holding member 6a according to the second embodiment.
Figure 10:
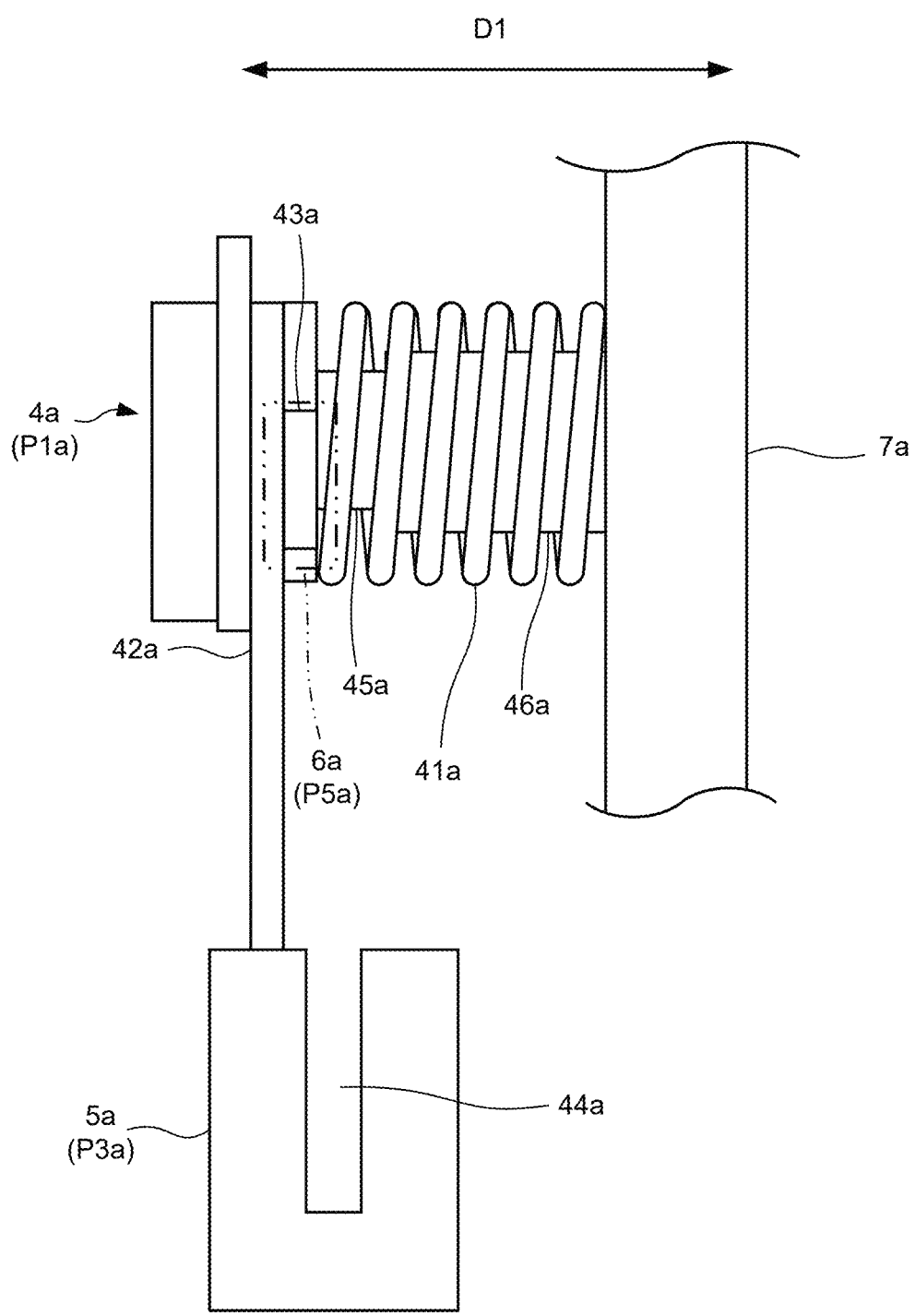
FIG. 10 is a schematic view showing a lock (restriction or rest) state and a mechanism of a lock member 4a, a trigger lever 5a, and a holding member 6a according to a second embodiment.

Similar to the above-described embodiment, the lock member 4a comprises one or more first protrusions 42a and a second protrusion 43a. See FIGS. 6-8 and 10-12. Therefore, in a state where the lock member 4a is at the first position P1a, the first protrusion 42a and the second protrusion 43a are connected to the trigger lever 5a and a part of the holding member 6a, respectively, and restrict movement thereof as shown in FIGS. 6, 8, and 10. Therefore, the trigger lever 5a remains in a third position P3a, and the holding member 6a remains in a fifth position P5a. As shown in FIGS. 6 and 7, when the lock member 4a is at the first position P1a, the tips of the second protrusion 43a and the holding member 6a engage in the rotational direction. Thus, the movement of the holding member 6a in the rotational direction is restricted. Further, when the lock member 4a moves toward the second position P2a, the lock member 6a rotates and the tip of the lock member 6a moves into the space where the second protrusion 43a was positioned. The tips of the second protrusion 43a and the holding member 6a engage in the right and left direction to restrict the left-right movement of the lock member 4a.

Figure 11:
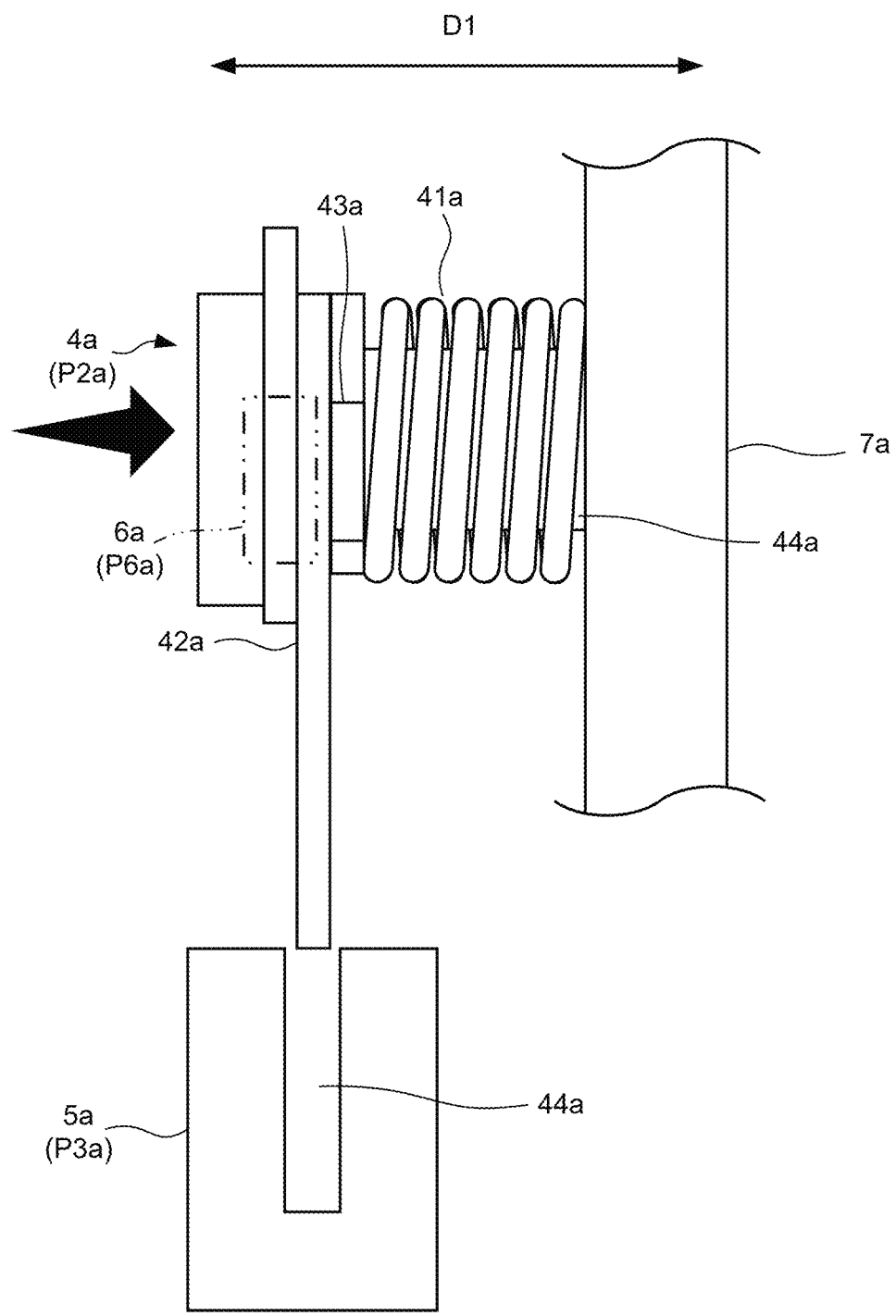
FIG. 11 is a view showing a state in which the lock member 4a has moved from a first position to a second position.

The lock member 4a is pressed and moves from the first position P1a to the second position P2a (see FIG. 11). In a state where the lock member 4a is at the second position P2a, the first protrusion 42a and the second protrusion 43a do not contact with the trigger lever 5a and the holding member 6a, respectively (see FIGS. 7, 11, and 12). Specifically, since the first protrusion 42a is in a state where the first protrusion 42a can enter a hollow portion 44a formed in the trigger lever 5a, the first protrusion 42a does not contact with the trigger lever 5a, and the second protrusion 43a does not contact with the holding member 6a by moving (see FIGS. 7, 11, and 12). In this way, a lockout (state of release) state is generated as shown in FIG. 7. Therefore, the trigger lever 5a can move from the third position P3a to a fourth position P4a (see FIG. 12). When the trigger lever 5a moves from the third position P3a to the fourth position P4a, the trigger lever 5a energizes an electric circuit to drive an action unit 3 by contacting with a limit switch 8a (see FIG. 7). On the other hand, in a state where the holding member 6a is at a sixth position P6a from the fifth position P5a, a part of the holding member 6a contacts with the second protrusion 43, and movement of the lock member 4a is restricted as shown in FIG. 12.

As described above, in a state where the lock member 4a is at the first position P1a, movement of the trigger lever 5a and the holding member 6a are restricted, however, in a state where the lock member 4a is at the second position P2a as shown in FIGS. 6 and 10, the movement of both the trigger lever 5a and the holding member 6a are not restricted (see FIGS. 7, 11, and 12). In this way, mechanism generated by the lock (state of restriction) state and the lockout (state of release) state according to the position of the lock member 4 (4a) is the same as in the above-described embodiment.

FIG. 8 is a cross-sectional view showing an elastic member comprised by the trigger lever 5a and the holding member 6a according to the second embodiment. Similar to the above-described embodiment, since the lock member 4a has an elastic member 41a as shown in FIGS. 6 and 10-12, the lock member 4a is pressed to move from the first position P1a to the second position P2a (see FIGS. 10 and 11). On the other hand, the trigger lever 5a and the holding member 6a are both restrained by a third elastic member 61a, as shown in FIG. 8. Therefore, the holding member 6a is pressed to move from a fifth position P5a to a sixth position P6a as shown in FIGS. 6 and 7. The trigger lever 5a is also pressed to move from a third position P3a to a fourth position P4a as shown in FIGS. 11 and 12.

In this way, the mechanism for forming the lock (state of restriction) state and the lockout (state of release) state of the above-described embodiment and the second embodiment are identical. A direction in which the lock member 4 moves linearly is determined in consideration of various conditions such as technical specifications of the driving apparatus 1, application, and operating environment.

3. Configuration of Output Operation Unit (Grasping Member 7) of Brush Cutter 11 (Driving Apparatus 1)

The lock member 4, the trigger lever 5 and the holding member 6 according to output operation of the brush cutter 11 are connected to the grasping member 7 and are operated by the user. Therefore, these components are required to have arrangement and configuration with excellent operability. The lock member 4 is configured to move in a direction in which the container 2 extends as described above. This means that after the lock member 4 moves from the first position P1 to the second position P2, the state becomes unlocked, and the trigger lever 5 and the holding member 6, which are comprised as the same as the lock member 4 in a direction in which the container 2 extends, are quickly operated.

Therefore, as long as the movement of the lock member 4 from the first position P1 to the second position P2 may be either linear or rotational as long as the movement is in a direction in which the container 2 extends or in a direction orthogonal to a direction in which the container 2 extends.

Next, the trigger lever 5 and the holding member 6, which are connected to the grasping member 7, are preferably operated by the user with one hand. Specifically, the configuration is such that when the user grasps the grasping member 7, at least one of index finger, middle finger, ring finger or little finger can press the trigger lever 5. Then, the holding member 6 is connected to the grasping member 7 opposing the trigger lever 5, and the configuration is such that at least one portion of thumb, palm, or ball of the thumb of the user can press the holding member 6.

Figure 9:
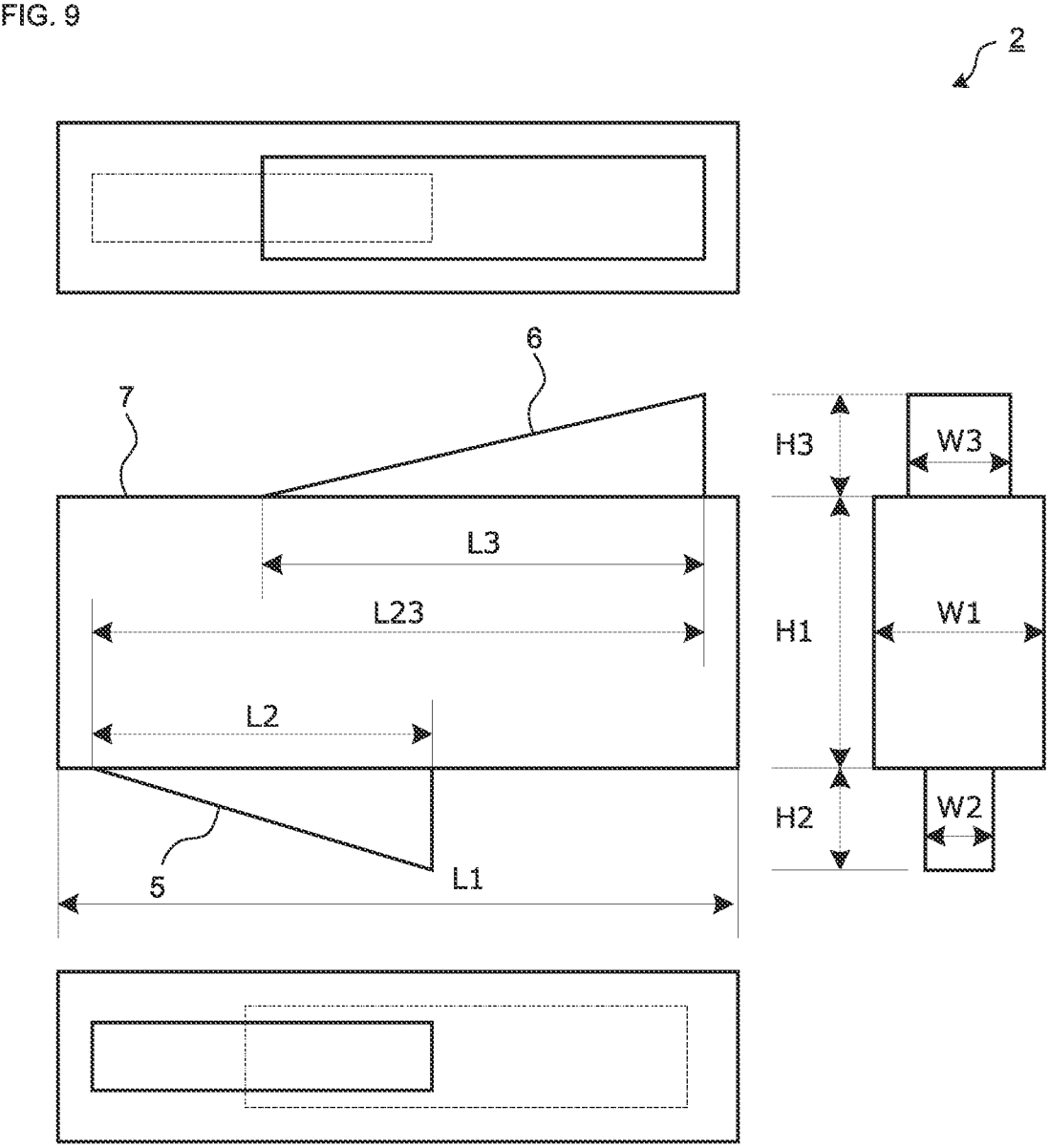
FIG. 9 shows the grasping member 7 connected to a trigger lever 5 and the holding member 6 using the third angle projection.

FIG. 9 shows the grasping member 7 connected to the trigger lever 5 and the holding member 6 using a third angle projection. Configuration and arrangement of the trigger lever 5 and the holding member 6 around the holding member 6 are determined in consideration of operability of the user.

As shown in FIG. 9, the trigger lever 5 and the holding member 6 are preferably, but not limited to, shark fins in consideration of operability.

Considering size or shape of hand of the user, it is desirable that the user can grasp the grasping member 7 as naturally as possible and can operate the trigger lever 5 and the holding member 6. Thus, design data as described below are preferably for dimension thereof.

(Height of trigger lever H2/length of trigger lever L2) and (height of holding member H3/length of holding member L3) of the shark fin-shaped trigger lever 5 and the holding member 6 are preferably greater than 0 and less than 1. Therefore, value of (height of trigger lever H2/length of trigger lever L2) and (height of holding member H3/length of holding member L3) may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in a range between any two of the numerical values illustrated above.

For ratio of height of the trigger lever 5 or the holding member 6 to the height of the grasping member 7, (height of trigger lever H2/height of grasping member H1) and (height of holding member H3/height of grasping member H1) are preferably greater than 0 and less than 1. Therefore, value of (height of trigger lever H2/height of grasping member H1) and (height of holding member H3/height of grasping member H1) may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in a range between any two of the numerical values illustrated above.

For ratio of width of the trigger lever 5 or the holding member 6 to the width of the grasping member 7, (width of trigger lever W2/width of grasping member W1) and (width of holding member W3/width of grasping member W1) are preferably greater than 0 and less than 1. Therefore, value of (width of trigger lever W2/width of grasping member W1) and (width of holding member W3/width of grasping member W1) may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in a range between any two of the numerical values illustrated above.

As described above, the trigger lever 5 is operated by at least one of the index finger, the middle finger, the ring finger, or the little finger, and the holding member 6 is operated by at least one portion of the thumb, the palm, or ball of the thumb. Therefore, considering positional relationship between the operating finger and portion, the trigger lever 5 is preferably arranged at a front side 1f than the holding member 6.

For ratio of length of the trigger lever 5 and length of the holding member 6 to a distance from a front end of the trigger lever 5 to a rear end of the holding member 6, (length of holding member L3/total length from the front end of the trigger lever to the rear end of the holding member L23) and (length of trigger lever L2/total length from the front end of the trigger lever to the rear end of the holding member L23) are preferably greater than 0 and less than 1. Therefore, value of (length of holding member L3/total length from the front end of the trigger lever to the rear end of the holding member L23) and (length of trigger lever L2/total length from the front end of the trigger lever to the rear end of the holding member L23) may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or may be in a range between any two of the numerical values illustrated above.

3. Operation Procedure Related to Driving of Brush Cutter 11

In this chapter, the operating procedure related to driving of the brush cutter 11 will be illustrated in chronological order. Table 1 is a state transition table showing components driven by the brush cutter 11. Hereinafter, the components in the above-described embodiment will be described based on the table.

TABLE 1

| POSITION PATTERN | LOCK MEMBER 4 | | TRIGGER LEVER 5 | | HOLDING MEMBER 6 | | ACTION UNIT 3 STATE |
|---|---|---|---|---|---|---|---|
| | FIRST POSITION P1 | SECOND POSITION P2 | THIRD POSITION P3 | FOURTH POSITION P4 | FIFTH POSITION P5 | SIXTH POSITION P6 | |
| A1 | ○ | | ○ | CANNOT MOVE | ○ | CANNOT MOVE | OFF |
| A2 | | PRESS ○ | ○ | | ○ | | OFF |
| A3 | | PRESS ○ | | PRESS ○ | ○ | | ON |
| A4 | | MAINTAIN STATE ○ | ○ | | | PRESS ○ | OFF |
| A5 | | MAINTAIN STATE ○ | | PRESS ○ | | PRESS ○ | ON |

3.1 State Transition of Lock Member 4, Trigger Lever 5 and Holding Member 6

In a position pattern A1, the lock member 4 is in a state in which the lock member 4 is at the first position P1. The trigger lever 5 is in a state in which the trigger lever 5 is at the third position P3, and the holding member 6 is in a state in which the holding member 6 is at the fifth position P5. In this state, the movement of the trigger lever 5 and holding member 6 is restricted for safety. This is the so-called lock (state of restriction) state, which is a state where the brush cutter 11 is not used. Specifically, a first protrusion 42 and a second protrusion 43 of the lock member 4 are contact with the trigger lever 5 and the holding member 6, respectively. As a result, it is configured to restrict the trigger lever 5 from moving from the third position P3 to the fourth position P4, and to restrict the holding member 6 from moving from the fifth position P5 to the sixth position P6.

The lock member 4 comprises a first elastic member 41 energizing force from the second position P2 toward the first position P1. As a result, accidental movement of the lock member 4 from the first position P1 to the second position P2 can be prevented. Therefore, the lock member 4 is configured to move from the first position P1 to the second position P2 by being pressed by the user in a direction from the front side 1f toward a rear side 1r.

In a position pattern A2, the lock member 4 is in a state in which the lock member 4 is at the second position P2. The trigger lever 5 is in the state in which the trigger lever 5 is at the third position P3, and the holding member 6 is in the state in which the holding member 6 is at the fifth position P5. As a result, the state in which the lock member 4 is at the second position P2 is the so-called lockout (state of release) state. Therefore, the restriction on the movement of the trigger lever 5 and the holding member 6 is released.

In a position pattern A3, the lock member 4 is in the state in which the lock member 4 is at the second position P2. The trigger lever 5 is in a state in which the trigger lever 5 is at the fourth position P4, and the holding member 6 is in the state in which the holding member 6 is at the fifth position P5. In this state, by moving the trigger lever 5 to the fourth position P4, the limit switch 8 arranged between the lock member 4 and the trigger lever 5 energizes an electric circuit (not shown) comprised by the brush cutter 11 to drive the action unit 3. In such a lockout (state of release) state, the user needs to keep pressing the lock member 4 and press and hold the trigger lever 5 at the fourth position P4.

In a position pattern A4, the lock member 4 is in the state in which the lock member 4 is at the second position P2. The trigger lever 5 is in the state in which the trigger lever 5 is at the third position P3, and the holding member 6 is in a state in which the holding member 6 is at the sixth position P6. In this state, a part of the holding member 6 contacts with the second protrusion 43 of the lock member 4, and the movement of the lock member 4 is restricted.

In a position pattern A5, the lock member 4 is in the state in which the lock member 4 is at the second position P2. The trigger lever 5 is in the state in which the trigger lever 5 is at the fourth position P4, and the holding member 6 is in the state in which the holding member 6 is at the sixth position P6. In this state, a part of the holding member 6 contacts with the second protrusion 43 of the lock member 4, and the movement of the lock member 4 is restricted. In other words, the lockout (state of release) state is maintained. By moving the trigger lever 5 to the fourth position P4, the limit switch 8 arranged between the lock member 4 and the trigger lever 5 energizes the electric circuit (not shown) comprised by the brush cutter 11 to drive the action unit 3.

3.2 Driving Operation Procedure of Brush Cutter 11

By moving the lock member 4 from the first position P1 to the second position P2, the state transitions from the position pattern A1 to the position pattern A2 to become the lockout (state of release) state. In this state, only the trigger lever 5 is moved from the third position P3 to the fourth position P4, and the action unit 3 can be driven by making the position pattern P3. Further, at the same time as moving the trigger lever 5 in this way, or set a time lag, the user can move the holding member 6 from the fifth position P5 to the sixth position P6 to drive the action unit 3 as in the position pattern A5. The former is a useful function when the action unit 3 is driven quickly without temporarily operating the holding member 6. The latter is a useful function when the holding member 6 restricts the movement of the lock member 4 so as to continuously maintain the lockout (state of release) state.

To continuously maintain the lockout state, the user presses the holding member 6 to move from the fifth position P5 to the sixth position P6. As a result, the position pattern A2 becomes the state of position pattern A4 or the position pattern A5. In this case, independently of the movement of the trigger lever 5, the holding member 6 can be moved from the fifth position P5 to the sixth position P6 to become the state of the position pattern A4 or the position pattern A5. The user can flexibly operate the brush cutter 11.

While continuously maintaining the lockout (state of release) state in this way, the user can drive or stop the action unit 3 by moving and operating the trigger lever 5. When a foreign object such as a stone is detected, the user can quickly stop the action unit 3 by simply operating the trigger lever 5. The user can protect himself/herself from crushing stone or other foreign object.

4. Others

The aforementioned embodiments may be implemented by the following aspects.

(1) The brush cutter 11 (the driving apparatus 1) may comprise a current control mechanism. For instance, by comprising a variable resistor in the container 2, it is configured that current value can be varied while the trigger lever 5 moves between the first position P1 and the second position P2. By varying mechanical energy for mowing or cutting the object, flexible lawn mowing is performed.

(2) The brush cutter 11 (the driving apparatus 1) may comprise an abnormality detection mechanism. When the abnormality detection mechanism detects a large load on the action unit 3, the lock member 4 is forcibly moved from the second position P2 to the first position P1 to stop the brush cutter 11. As a result, safety is further ensured.

(3) The brush cutter 11 (the driving apparatus 1) may comprise a mechanism, when the lock member 4 moves to the first position P1, the holding member 6 also moves to the fifth position P5 in conjunction therewith. When the lock member 4 is at the first position P1, i.e., the lock (state of restriction) state, the holding member 6 becomes in a state in which the holding member 6 is at the sixth position P6. The lock member 4 moves to the second position P2, and becomes the lockout (state of release) state. The holding member 6 is at the fifth position P5 and can move between the fifth position P5 and the sixth positions P6. When the brush cutter 11 is not in operation, the holding member 6 can be prevented from touching.

(4) The straight line connecting the first position P1 and the second position P2 of the lock member 4 may extend obliquely to a direction in which the container 2 extends. From a user-friendly point of view, it is preferable to determine the movement direction of the lock member 4 according to content of application, specification, operating environment, or the like of the driving apparatus 1.

Furthermore, the present invention may be provided in each of the following aspects.

The driving apparatus wherein the lock member comprises a first elastic member between the lock member and the container, the first elastic member energizing the lock member in a direction from the second position to the first position, and is configured to move from the first position to the second position by being pressed in a direction from the front side to the rear side.

The driving apparatus further comprising: a holding member configured to move between a fifth position and a sixth position, to be restricted from moving to the sixth position when the lock member is at the first position, not to be restricted from moving to the sixth position when the lock member is at the second position, and to restrict the movement of the lock member when the holding member is at the sixth position.

The driving apparatus further comprising: a grasping member, wherein the lock member is connected to the grasping member, and is energized to move from the first position to the second position, the trigger lever is connected to the grasping member, and is pressed down to move from the third position to the fourth position, and the holding member is connected to the grasping member opposing the trigger lever, and is pressed to move from the fifth position to the sixth position.

The driving apparatus wherein the lock member comprises a first protrusion configured, by contacting with the trigger lever in a state in which the lock member is at the first position, to restrict the trigger lever from moving from the third position to the fourth position.

The driving apparatus wherein the lock member comprises a second protrusion, by contacting with the second protrusion in a state in which the holding member is at the sixth position, to restrict the lock member from moving from the second position to the first position.

The driving apparatus wherein the holding member comprises a second elastic member between the holding member and the container, the second elastic member energizing the holding member in a direction from the sixth position to the fifth position.

The driving apparatus further comprising: a limit switch arranged between the lock member and the trigger lever, and configured to energize an electric circuit to drive the action unit when the lock member moves to the second position and the trigger lever moves to the fourth position.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. A handheld driving apparatus for mowing or cutting an object, the handheld driving apparatus being extended along a longitudinal direction from a container to an action unit in a plan view, the handheld driving apparatus comprising:
   the container having a grasping member, the grasping member being configured to be held by a user while operating the handheld driving apparatus;
   a lock member
      including a first protrusion and a second protrusion, and
      configured to be movably connected to the grasping member and move between a first position and a second position along a right and left direction, the first position being a rest position of the lock member, the second position being a fully pressed position of the lock member, the right and left direction being perpendicular to the longitudinal direction in the plan view;

a trigger lever configured
- to be movably connected to the grasping member and move between a third position and a fourth position, the third position being a rest position of the trigger lever, the fourth position being a fully pressed position of the trigger lever,
- to be restricted to move toward the fourth position in a first moving direction by contacting with the first protrusion of the lock member when the lock member is at the first position, and
- not to be restricted to move toward the fourth position in the first moving direction without contacting with the first protrusion of the lock member when the lock member is at the second position;

the action unit
- provided on the front side of the container, and
- configured to drive in such a manner that a mechanical action for mowing or cutting the object is applied to the object when the trigger lever is at the fourth position; and a holding member configured
- to be movably connected to the grasping member and move between a fifth position and a sixth position, the fifth position is a rest position of the holding member, and the sixth position is a fully pressed position of the holding member,
- to be restricted to move toward the sixth position in a second moving direction by contacting with the second protrusion of the lock member when the lock member is at the first position,
- not to be restricted to move toward the sixth position in the second moving direction without contacting with the second protrusion of the lock member when the lock member is at the second position, and
- to restrict the movement of the lock member when the holding member is at the sixth position.

2. The handheld driving apparatus according to claim 1, further comprising a first elastic member, wherein:
- the first elastic member is provided between the lock member and the grasping member, and the first elastic member is configured to energize the lock member along the right and left direction from the second position to the first position, and
- the lock member is configured to move from the first position to the second position by being pressed along the right and left direction.

3. The handheld driving apparatus according to claim 1, wherein:
- the holding member include another elastic member between the holding member and the grasping member, and the second elastic member is configured to energize the holding member in a direction from the sixth position to the fifth position.

4. The handheld driving apparatus according to claim 1, further comprising:
- a limit switch
  - arranged between the lock member and the trigger lever, and
  - configured to initiate to cause the action unit to be driven when the lock member moves to the second position and the trigger lever moves to the fourth position.

5. The handheld driving apparatus according to claim 1, wherein
- the grasping member extends along the longitudinal direction, and
- a length along the longitudinal direction of the grasping member is larger than a width along the right and left direction of the grasping member.

* * * * *